(12) United States Patent
Maunder et al.

(10) Patent No.: US 8,674,870 B2
(45) Date of Patent: Mar. 18, 2014

(54) METHODS AND APPARATUS FOR ACTIVE REFLECTION

(75) Inventors: David Paul Maunder, Gainesville, VA (US); Charles H. Cox, III, Carlisle, MA (US); David Morgan Kettner, Stow, MA (US); Kevin M. Cuomo, Carlisle, MA (US)

(73) Assignee: Photonic Systems, Inc., Billerica, MA (US)

( * ) Notice: Subject to any disclaimer, the term of this patent is extended or adjusted under 35 U.S.C. 154(b) by 202 days.

(21) Appl. No.: 13/009,839

(22) Filed: Jan. 19, 2011

(65) Prior Publication Data

US 2012/0182176 A1   Jul. 19, 2012

(51) Int. Cl.
*H01Q 15/00* (2006.01)

(52) U.S. Cl.
USPC .............................................................. 342/6

(58) Field of Classification Search
USPC ......................................................... 342/5–12
See application file for complete search history.

(56) References Cited

U.S. PATENT DOCUMENTS

| | | | |
|---|---|---|---|
| 3,731,313 A | 5/1973 | Nagai | |
| 5,280,297 A * | 1/1994 | Profera, Jr. | 343/754 |
| 6,867,747 B2 * | 3/2005 | Price et al. | 343/895 |
| 7,079,780 B1 | 7/2006 | Rollins | |
| 2003/0048971 A1 * | 3/2003 | Ionov | 385/10 |
| 2005/0156804 A1 * | 7/2005 | Ratni et al. | 343/773 |
| 2006/0039221 A1 * | 2/2006 | Fukuda | 365/222 |
| 2007/0070358 A1 * | 3/2007 | Ouchi | 356/614 |
| 2009/0232188 A1 * | 9/2009 | Guenther et al. | 375/133 |

OTHER PUBLICATIONS

Burns, W.K., Multi-Octave Operation of Low-Biased Modulators by Balanced Detection, IEEE Photonics Technology Letters, Jan. 1996, pp. 130-133 vol. 8, No. 1.
Sea-me Active Radar Reflector. Safety at Sea, [retrieved on Mar. 16, 2011], Retrieved from the Internet: http://www.sea-me.co.uk.

* cited by examiner

*Primary Examiner* — Timothy A Brainard
(74) *Attorney, Agent, or Firm* — Kurt Rauschenbach; Rauschenbach Patent Law Group, LLC

(57) ABSTRACT

An electromagnetic reflector includes an antenna that receives an incoming signal and that transmits an outgoing signal. A three-port device, such as a circulator, has a first port electromagnetically coupled to the antenna. An RF circuit has an input that is electromagnetically coupled to the second port of the three-port device and an output that is electromagnetically coupled to the third port of the three-port device. The RF circuit changes at least one of a gain and a phase of the incoming signal to generate a desired outgoing signal that passes through the three-port device to the antenna.

44 Claims, 6 Drawing Sheets

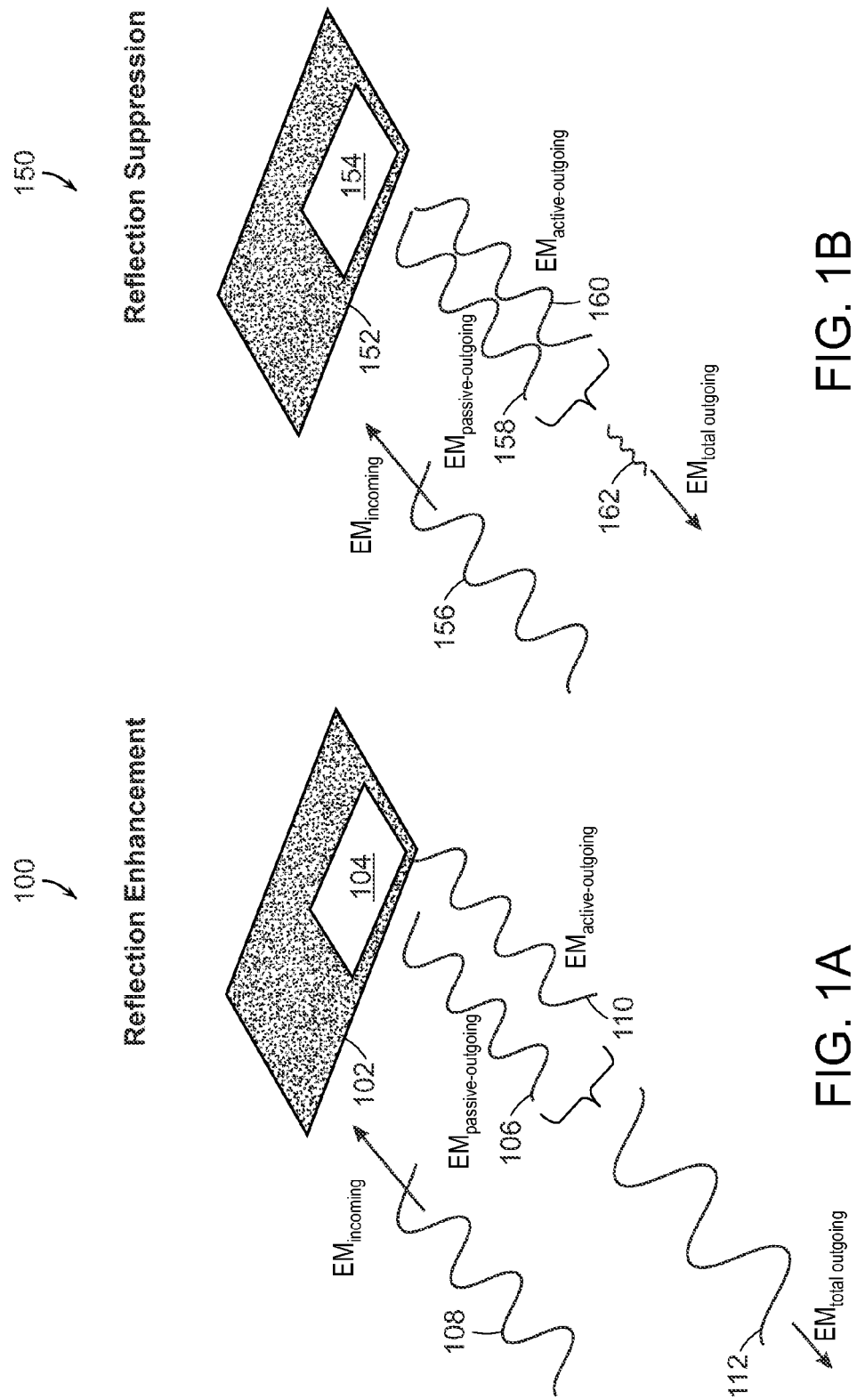

METHODS AND APPARATUS FOR ACTIVE REFLECTION

The section headings used herein are for organizational purposes only and should not to be construed as limiting the subject matter described in the present application in any way.

INTRODUCTION

The present teaching relates to reflecting devices. Reflection of any type of wave occurs whenever there is a change in the wave propagation properties of the space through which the wave is traveling. For example, electromagnetic waves propagating in air reflect when they encounter a metal or dielectric surface. Although a surface is often thought of as being planar, the term "planar" is defined herein to generally denote the location in space where there is a change in wave propagation properties. For an ideal reflection, all the energy in the incident wave is completely contained in the incoming direction and all the reflected energy is completely contained in the reflected wave propagating in the reflected direction.

All naturally occurring reflections are passive in the sense that no energy is added to the reflected wave during the reflection process. Thus, with passive reflections, conservation of energy requires that the total energy in the reflected wave be less than or equal to the energy in the incident wave. With most reflections, the energy of the passively reflected wave is less than that of the incident wave. That is, there is some energy lost in the reflection processes.

Active reflection occurs when a wave is generated in response to a wave that is incident on a surface. Since an active reflector can add energy, the actively reflected energy can be greater than or less than the energy of the passive reflection. Active reflection when the sum of the energy of the passive and reflected waves is greater than the energy of the passive reflection alone is called reflection enhancement. Active reflection when the sum of the energy of the passive and reflected waves is less than the energy of the passive reflection alone is called reflection suppression.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicants' teaching in any way.

FIG. 1A shows a schematic diagram that illustrates reflection enhancement from a surface of an active reflector.

FIG. 1B shows a schematic diagram that illustrates reflection suppression from a surface with an active reflector.

DESCRIPTION OF VARIOUS EMBODIMENTS

Figure 2B:
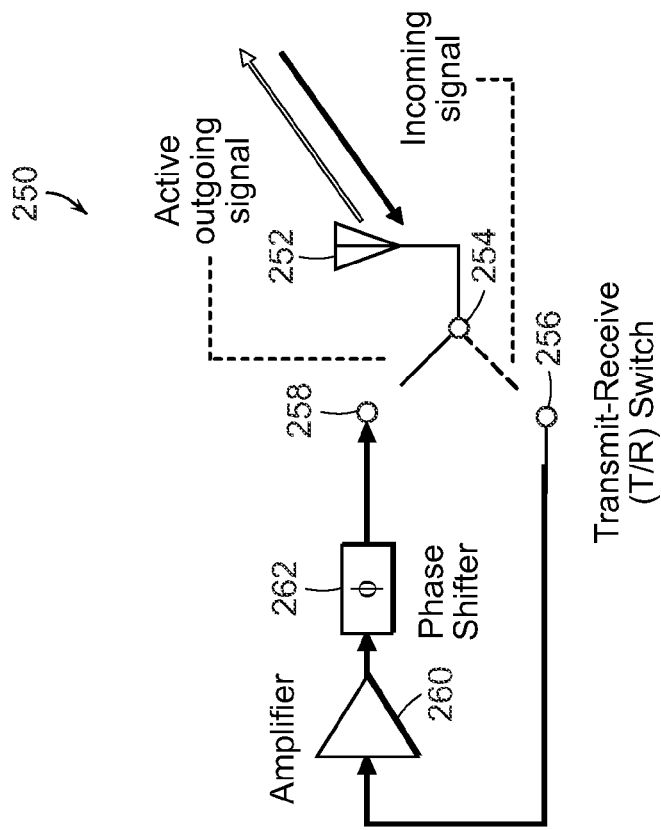
FIG. 2B is a simplified block diagram of a second type of known active reflector that includes a single antenna that is used to both detect the incoming signal and to radiate the outgoing signal, and a transmit/receive switch that is used to alternatively connect a receiver input and a transmitter output of the active reflector.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reflection of electromagnetic waves is described herein. However, it should be understood that the active and passive reflections described in connection with the present teaching can apply to any type of wave. Also, it should be understood that the methods and apparatus of the present invention can use any type of multi-port non-reciprocal electronic device, such as ferrite circulators, electronic circulators, optical circulators, and photonic circulators.

FIG. 1A shows a schematic diagram 100 that illustrates reflection enhancement from a surface 102, which includes an active reflector 104. Reflection enhancement amplifies the passively reflected outgoing signal 106. In operation, an incoming electromagnetic signal 108 propagates onto the surface 102 and a portion of the incoming electromagnetic signal 108 is received by the active reflector 104. The passively reflected outgoing electromagnetic signal 106 is reflected by the surface 102. In addition, an active outgoing electromagnetic signal 110 is generated by the active reflector 104. For a given amplitude of the active outgoing wave, the maximum reflection enhancement occurs when the active outgoing signal 110 is in phase with the passive reflected outgoing electromagnetic signal 106. Arbitrary amounts of reflection enhancement can be obtained by using various combinations of the amplitude of the active outgoing wave and the phase between the active outgoing wave and the passive reflection. In the reflection enhancement mode, the total outgoing electromagnetic signal 112 is an amplified version of the passively reflected signal 106.

The total outgoing electromagnetic signal 112 may or may not have an amplitude that is greater than the incoming electromagnetic signal depending upon the specific application. For many applications, however, it is desirable to enhance the outgoing electromagnetic signal so that the amplitude of the outgoing electromagnetic signal is greater than the amplitude of the incoming electromagnetic signal. For example, reflection enhancement is desirable for radar reflectors. Reflection enhancement can be used to amplify the passive radar signal reflections from a small boat or airplane to make the small boat or airplane more visible to radar interrogation.

FIG. 1B shows a schematic diagram 150 that illustrates reflection suppression from a surface 152 with an active reflector 154. Reflection suppression attenuates the passively reflected outgoing signal. In operation, an incoming electromagnetic signal 156 propagates onto the surface 152 and a portion of the incoming electromagnetic signal 156 is received by the active reflector 154. A passive outgoing electromagnetic signal 158 is reflected by the surface 152. In addition, an active outgoing electromagnetic signal 160 is generated by the active reflector 154. For maximum suppression, the amplitude of the active outgoing signal is set to equal the amplitude of the passive reflection signal and the phase of the active outgoing signal is set to be 180 degrees out-of-phase with the passive reflected outgoing electromagnetic signal 158. In the suppression mode, the total outgoing electromagnetic signal 162 is an attenuated version of the passive reflected outgoing electromagnetic signal 158.

There are many applications where it is desirable to perform reflection suppression. One application is to use reflection suppression to create an anti-reflection coating. Antireflection coatings are commonly used for many optical applications. Another application for reflection suppression is to reduce passive radar signal reflections to make objects less visible to radar interrogation.

Active reflection can be achieved with any type of reflecting surface. That is, active reflection can be achieved with a specular reflecting surface, which can be a mirror-like surface in which light from a single incoming direction is reflected into a single outgoing direction. Also, active reflection can be achieved with a diffuse reflecting surface where incoming light is reflected in a broad range of directions. In addition, active reflection can be achieved with a retro-reflection surface where the outgoing wave is directed back in the same direction from which the incoming wave came.

Active reflectors receive at least a portion of the incoming signal. The incoming signals are then amplified, attenuated, delayed and/or phase-shifted by amounts that are determined by the desired degree of reflection enhancement or reflection suppression of the passive reflection. The amplified, attenuated, delayed and/or phase shifted version of the incoming signal is then transmitted as the active outgoing signal. In order to simplify the description of the present teaching, the term "gain" is used herein in a general way, where gain greater than one represent positive gain and gain less than one represent negative gain or attenuation. Similarly, the term "phase shift" is used herein to refer to both phase shifts and delays, where delays are phase shifts that are greater than 360 degrees. Active retro-reflectors also determine the direction of the incoming wave and then control the direction of the actively generated outgoing signal so that it is the same direction from which the incoming wave came.

For most practical applications, active reflectors must also simultaneously receive the incoming signal and transmit the outgoing signal, so that the active reflection mimics the passive reflection. That is, the active reflector must generate a continuous outgoing signal when it receives a continuous incoming signal. Practical active reflectors must also have a high degree of isolation between the incoming and outgoing signals. If the incoming signal has a lower amplitude than the outgoing signal, the amount of outgoing signal that leaks into the incoming path will set a lower limit on the minimum level of the incoming signal that can be detected. Conversely, if the incoming signal has a greater amplitude than the outgoing signal, the amount of incoming signal that leaks into the outgoing signal path will set a lower limit on the level of the outgoing signal.

Figure 2A:
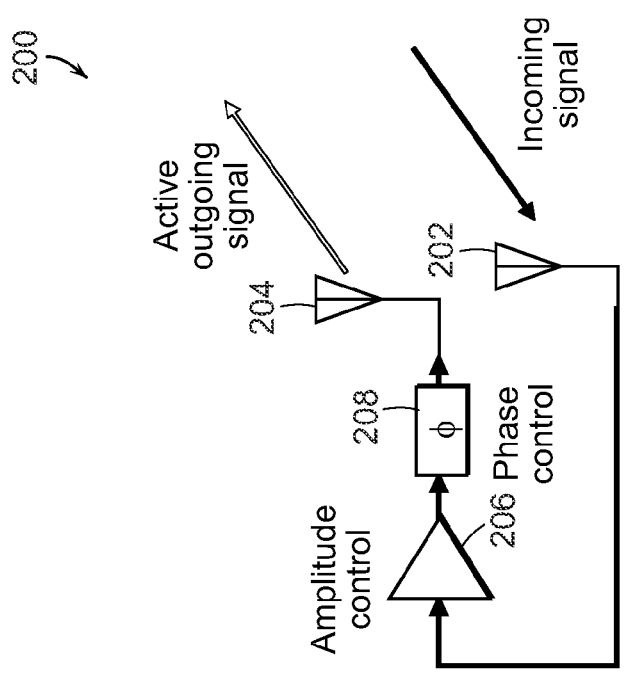
FIG. 2A is a simplified block diagram of a first type of known active reflector that include a separate receive antenna that is used to detect the incoming signal and a separate transmit antenna that used to radiate the outgoing signal.

FIG. 2A is a simplified block diagram of a first type of known active reflector 200 that include a separate receive antenna 202 that is used to detect the incoming signal and a separate transmit antenna 204 that used to radiate the outgoing signal. This first type of active reflector is sometimes referred to as an active repeater. The separate receive and transmit antennas 202, 204 permit this first type of active reflector to generate a continuous outgoing signal in response to a continuous incoming signal. The receive antenna 202 is electrically coupled to an amplitude control device 206 that can be an amplifier and/or an attenuator. The output of the amplitude control device 206 is coupled to a phase control device 208 that modifies the phase of the amplified or attenuated incoming signal to generate the desired outgoing signal. The phase control device 208 is coupled to the transmit antenna 204.

It is relatively difficult to achieve high isolation between the incoming and the outgoing signals with the first type of known active reflector because there are two separate antennas. However, the two antennas 202, 204 can be arranged so as to minimize mutual coupling between them. One means for minimizing the mutual coupling between the transmit and receive antennas 202, 204 is to position one of the transmit or receive antennas 202, 204 in a null of the antenna pattern of the other one of the transmit and receive antenna 202, 204. Positioning one antenna in the null antenna pattern of the other antenna typically requires that the two antennas having their main lobes of their respective antenna patterns with the highest gain pointing in different directions. Consequently, such active reflectors cannot generate the desired outgoing signal in an arbitrary direction and, in particular, cannot generate the desired outgoing signal in a direction that is opposite to the direction of propagation of the incoming signal. Applications where the active reflector needs to generate the outgoing signal in arbitrary directions include diffuse reflection systems where the outgoing signal propagates through a wide range of angles and retro-reflection systems where all the outgoing energy is directed back in the same direction from which the incoming wave came.

FIG. 2B is a simplified block diagram of a second type of known active reflector 250 that includes a single antenna 252 that is used to both detect the incoming signal and to radiate the outgoing signal, and a transmit/receive switch 254 that is used to alternatively connect a receive input 256 and a transmitter output 258 to the antenna 252. The active reflector design shown in FIG. 2B is currently used in a commercially available radar reflector that is known in the industry as the Sea Me Active Radar Reflector, which is manufactured by Munro Engineering Ltd, Stoke Trister, Wincanton, Somerset BA9 9PL, England.

The antenna 252 can be a single radiating element or can be an array of such elements. The receive input 256 of the active reflector 250 is electrically connected to an input of an amplitude control device 260 that can be an amplifier and/or an attenuator depending upon whether the active reflector is operating in the reflection enhancement or in the reflection suppression mode. The output of the amplitude control device 260 is coupled to a phase control device 266 that modifies the phase of the amplified or attenuated incoming signal to generate the desired outgoing signal. The output of the phase control device 266 is coupled to the transmit output 258.

The second type of active radar reflector shown in FIG. 2B has the limitation that it cannot generate a continuous replica of the incoming signal because the transmit/receive switch 254 is either configured to receive the incoming signal or to transmit the outgoing. That is, the second type of active radar reflector 250 cannot transmit and receive simultaneously in time. Consequently, the second type of active radar reflector 250 cannot reflect continuous or arbitrary pulsed signal waveforms.

Active reflectors according to the present teaching provide high incoming-to-outgoing (I-to-O) isolation for an arbitrary orientation of incoming and outgoing signals. Active reflectors according to the present teaching can also reflect continuous incoming or arbitrary pulsed waveforms in real time using a single antenna for both the incoming and outgoing signals.

Figure 3:
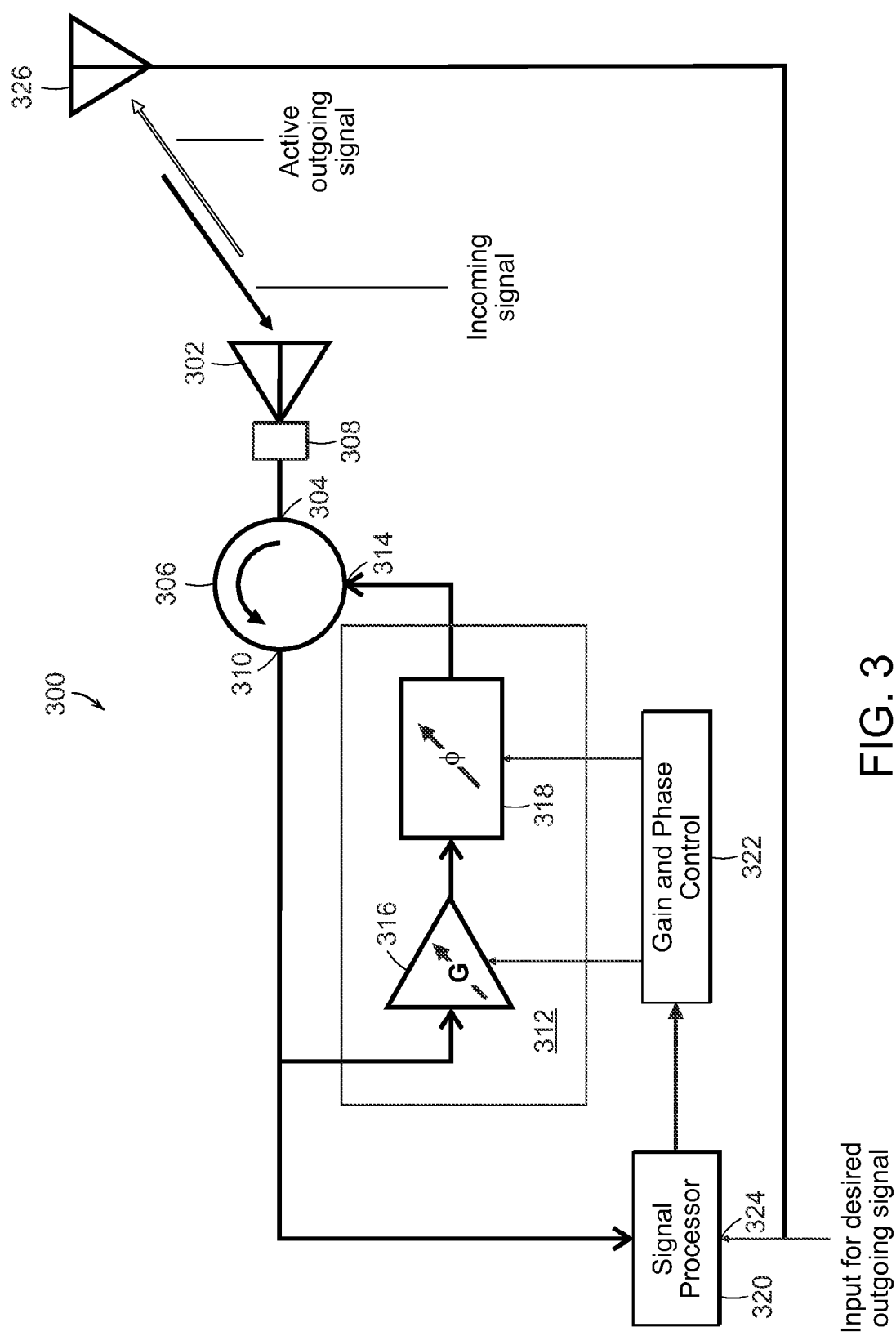
FIG. 3 illustrates a block diagram of an active electromagnetic reflector according to the present teaching that can generate a continuous or pulsed active reflection for arbitrary continuous or pulsed waveforms with a single antenna.

FIG. 3 illustrates a block diagram of an active electromagnetic reflector 300 according to the present teaching that can generate a continuous or pulsed active reflection for arbitrary continuous or pulsed waveforms with a single antenna. The active reflector 300 includes an antenna 302 that receives an incoming signal and that transmits an outgoing signal. Numerous types of antennas can be used. For example, the antenna 302 can be an omni-directional antenna or can be a retro-reflecting antenna.

The antenna 302 is electrically connected to a first port 304 of a non-reciprocal three-port device 306. In some embodiments of the present teaching, the three-port device 306 is a circulator. Any type of circulator can be used, such as a ferrite, optical, electronic, or photonic circulator. Some active reflectors according to the present teaching include an antenna matching circuit 308 that is coupled between the antenna 302 and the first port 304 of the three-port device 306. The antenna matching circuit 308 reduces an antenna return loss.

A second port 310 of the three-port device 304 is electromagnetically coupled to a circuit 312. The term "circuit" as used herein is a general term that refers to a device that manipulates electromagnetic signals at any frequency, such as RF and optical frequencies. In various embodiments, the circuit 312 can be an active or a passive circuit. Also, in various embodiments, the circuit 312 can include components such as amplifiers, attenuators, delays and phase shifters. For example, in one embodiment, the circuit 312 is an optical or RF amplifier. In another embodiment, the circuit 312 is an optical or RF attenuator. In another embodiment, the circuit 312 is an optical or RF phase shifter. In yet another embodiment, the circuit 312 is the combination of an optical amplifier and an optical phase shifter or the combination of an RF amplifier and a RF phase shifter. In yet another embodiment, the circuit 312 is the combination of an optical attenuator and an optical phase shifter or the combination of an RF attenuator and an RF phase shifter.

An output of the circuit 312 is electromagnetically coupled to the third port 314 of the three-port device. The circuit 312 includes components that change at least one of a gain, a phase, and a delay of the incoming signal to generate a desired outgoing signal that passes through the three-port device 306 to the antenna 302 where it is transmitted. In various embodiments, the circuit 312 comprises at least one of an electrically controllable gain control circuit 316 and an electrically controllable phase control circuit 318. The gain control circuit 316 described herein can provide either positive gain which amplifies the incoming signal or negative gain that attenuates the incoming signal. The gain control circuit 316 can be an electronic amplifier for providing gain at RF frequencies. Also, the gain circuit 316 can be an optical amplifier for providing gain at optical frequencies.

A signal processor 320 is used to control the electrically controllable gain control circuit 316 and the electrically controllable phase control circuit 318, where the terms "gain" and "phase" are used as defined herein. An input of the signal processor 320 is electrically connected to the second port 310 of the three-port device 306 so that the signal processor 320 samples the incoming signal. The signal processor 320 also includes an input 324 for receiving the desired outgoing signal or for receiving information characterizing the desired outgoing signal.

The signal processor 320 generates a signal at an output including information for changing at least one of the gain and phase of the incoming signal to generate the desired outgoing signal. In one embodiment, the signal processor 320 compares the amplitude and phase of the incoming signal with the amplitude and phase of the desired outgoing signal and then generates instruction signals for the gain and phase control circuits 316, 318. The gain and phase control circuits 316, 318 adjust the gain and phase of the incoming signal so that it is amplified or attenuated and phase shifted by the proper amount to generate the desired outgoing signal.

The embodiment shown in FIG. 3 includes a separate analog controller 322 having an input that is connected to the output of the signal processor 320 and having an output that is connected to control inputs of both the gain and phase control circuits 316, 318. In this embodiment, the signal processor 320 generates a digital control signal that instructs the controller 322 to send analog control signals to the gain and phase control circuits 316, 318 that causes the gain and phase control circuits 316, 318 to adjust the gain and phase of the incoming signal so that it is amplified or attenuated and phase shifted by the proper amount to achieve the desired outgoing signal.

The active reflector 300 shown in FIG. 3 can be configured to be a directional active reflector. An active directional reflector according to the present teaching includes a means for determining the direction of the incoming signal. One means for determining the direction of the incoming signal is to mechanically scan the antenna 302. For example, the user can rotate the antenna 302 to determine a maximum signal that corresponds to the direction of the incoming signal. However, because of symmetries in the antenna pattern, additional information may be needed under some operating conditions to correctly determine the direction of the incoming signal.

In addition, the active directional reflector includes a means for controlling a direction of the outgoing signal relative to the incoming signal. Single antenna elements have some directionality to their antenna pattern. In some systems, this directionality is sufficient to create an active directional antenna with the desired properties. In other systems, especially systems where more directionality is required, an antenna array is used. As is well known in the antenna art, antenna arrays are capable of generating a beam in a particular direction or in multiple directions if multiple beams are generated. Antenna arrays can also be used to control the beam width if enough antenna elements are used in the array.

One particular type of active directional reflector is the retro-reflector. Retro-reflectors generate outgoing waves in a direction that corresponds to the direction of the corresponding incoming wave. A well known example of a retro-reflector is an optical corner cube reflector that retro-reflects optical waves.

VanAtta antenna arrays are specifically designed for retro-reflection applications and are known in the art. See, for example, U.S. Pat. No. 3,731,313. VanAtta antenna arrays described in this patent have multiple channels of active reflectors, one channel to interface with each element in the array. The Van-Atta antenna array includes a plurality of equally spaced antenna elements positioned in parallel where respective pairs of antenna elements are positioned symmetrically with respect to the center of the antenna array. Feeders of substantially the same length interconnect the antenna elements. Impedance matching stubs having adjustable lengths are connected to the center of respective feeders in order to enable incoming electromagnetic waves to be re-radiated in an opposite direction to that in which they are receiving signals without changing the characteristic impedance of feeders.

The active reflector 300 shown in FIG. 3 can operate in either an enhancement mode that enhances the passive reflection or in a suppression mode that suppresses the passive reflection. In addition, the active reflector 300 shown in FIG. 3 can operate in either an open loop mode where the control on the parameters of the active reflected signal are independent of the parameters of the passive reflected signal or in a closed loop mode where the parameters of the active reflected signal are dependent on the parameters of the passive reflection signal.

Some methods of operation according to the present teaching do not require close loop operation with active control. For example, when operating in the enhancement mode, the user typically wants to maximize the active reflection signal, without regard to the relative signal strength of the passive reflection signal.

In other methods of operation according to the present teaching, closed loop operation is desirable or required. For example, when operating in the suppression mode, the degree of suppression depends critically on the degree to which the magnitude and phase of the active reflection exactly matches the magnitude and phase of the passive reflection. Achieving the desired magnitude and phase of the active reflection relative to the magnitude and phase passive reflection will often require the active reflector to operate in a closed loop mode.

A signal detector, such as an antenna 326 which is located external to the active reflector is used to detect both the passive and active reflections. An output of the antenna 326 is electrically connected to the input 324 of the signal processor 320. The antenna 326 generates an electrical feedback signal which is used by the signal processor 320 to adjust the gain and phase of the actively reflected signal relative to the passively generated signal. Using the antenna 326 to generate a feedback signal for the signal processor 320 enables the active reflector 300 to generate an active reflection signal that can be any function of the active and passive reflection.

For example, some methods of operating in the suppression mode generate an active signal that is chosen to substantially cancel the passive reflection in order to minimize or eliminate any reflected signals. There are many applications where it is desirable to eliminate reflected signals. The signal processor 320 can generate these signals by implementing a first order feedback loop including, for example, an electronic integrator. Such a feedback loop can be implemented to adjust the active reflector signal until the sum of the active and passive reflections is zero. One skilled in the art will appreciate that the signal processor 320 can implement any one of numerous other more sophisticated feedback loops that will enable more complex relations between the passive and active reflections.

In many operating modes of the active reflector of the present teaching, the amplitude of the incoming signal must be greater than the portion of the outgoing signal that leaks into a path of the incoming signal. In addition, in many operating modes of the active reflector of the present teaching, the amplitude of the outgoing signal must be greater than a portion of the incoming signal that leaks into the outgoing signal path. The performance of the active reflector according to the present teaching is often limited by the performance of the non-reciprocal three-port device 306.

Figure 4A:
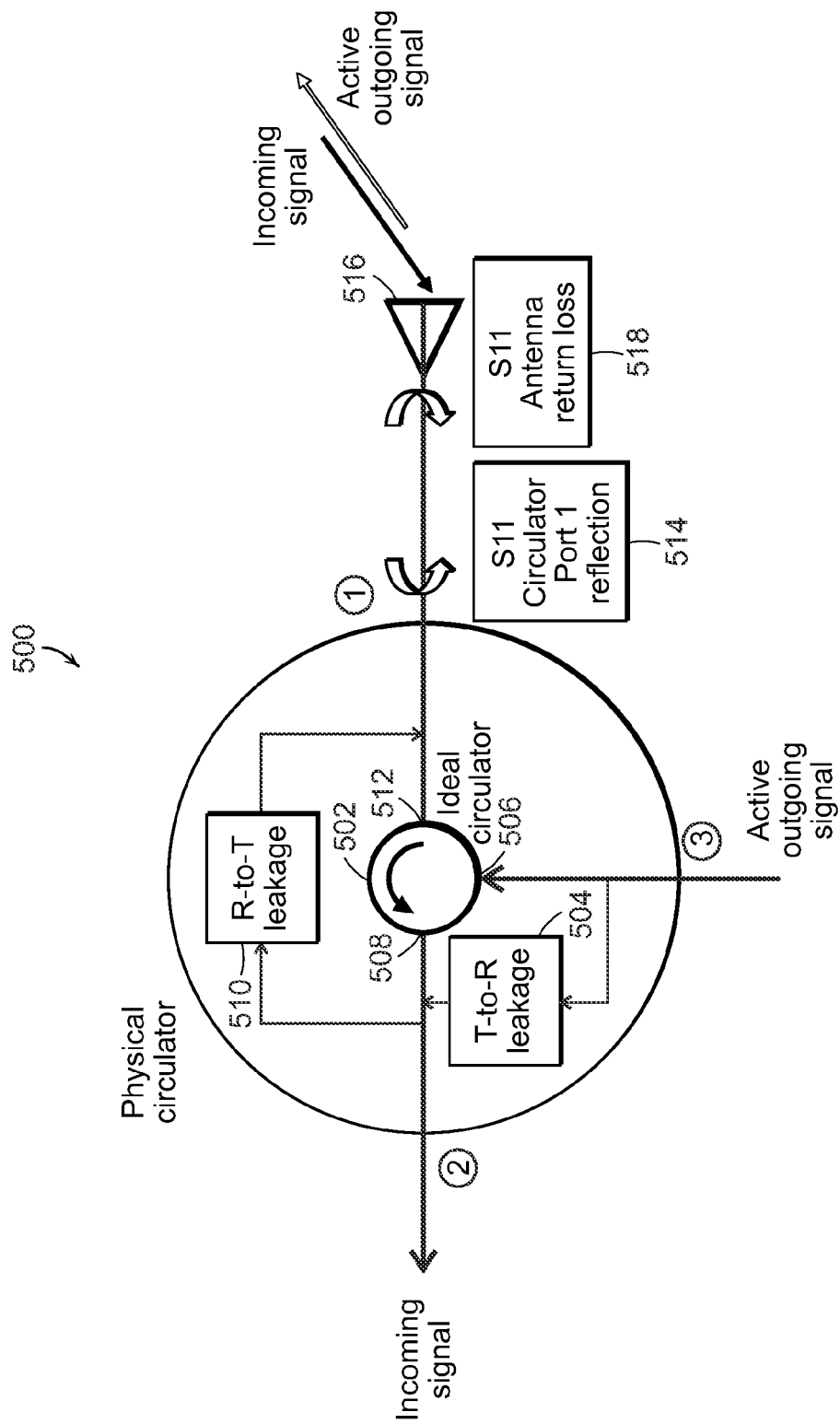
FIG. 4A illustrates a model of a circulator that is used to determine the performance limitations of an active reflector according to the present teaching.

FIG. 4A illustrates a model 500 of a circulator that is used to determine performance limitations of an active reflector according to the present teaching. The model 500 shows an ideal circulator 502 with a first leakage signal path 504 from the third port 506 to the second port 508 and a second leakage signal path 510 from the second port 508 to the first port 512. In addition, the model 500 shows the return loss 514 of the first port 512 that is connected to the antenna 516 and the return loss 518 of the antenna 516 itself.

Figure 4B:
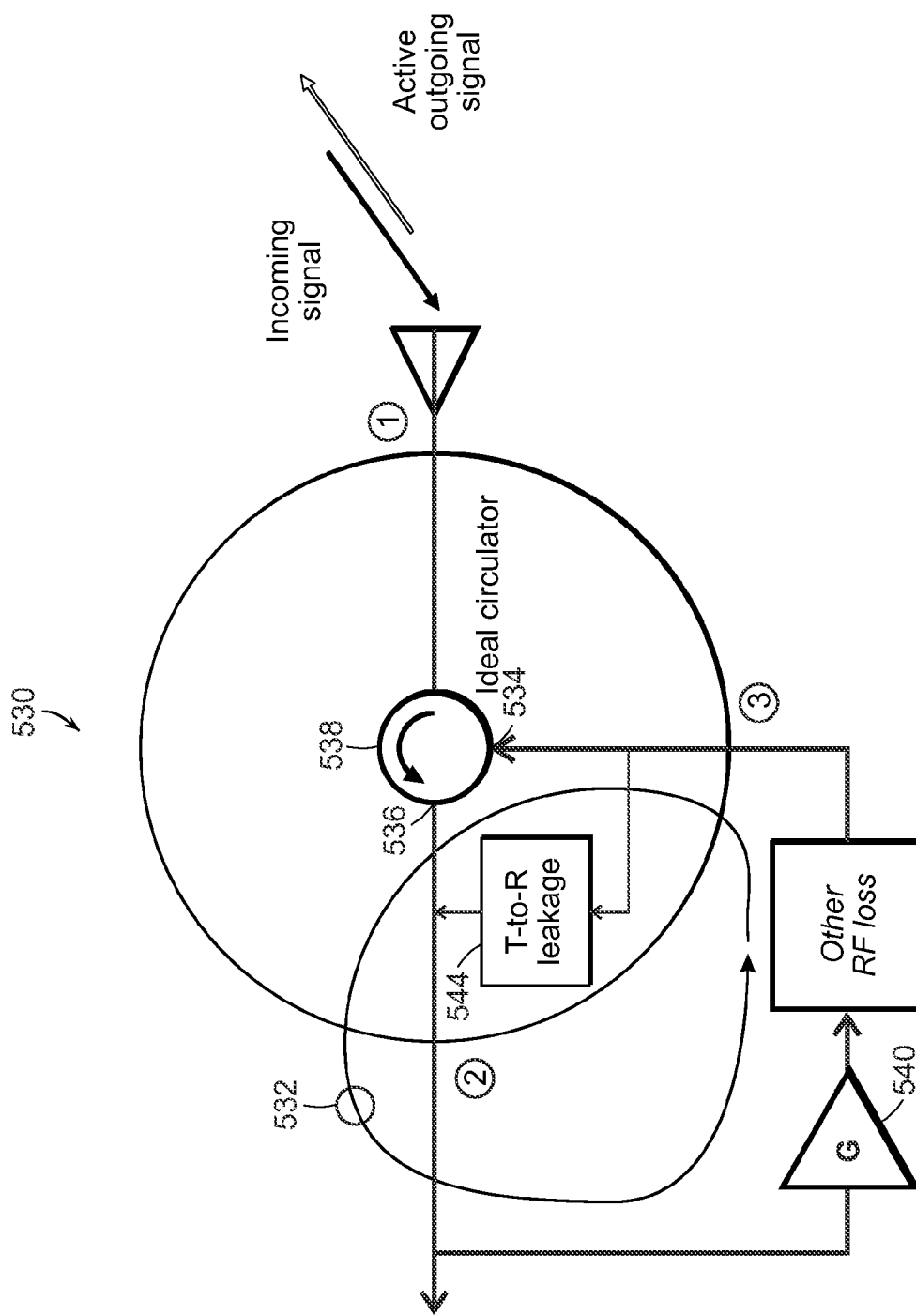
FIG. 4B illustrates a model of a circulator that shows the feedback loop between the third port and the second port.

FIG. 4B illustrates a model of a circulator 530 that shows the feedback loop 532 which includes a gain element 540 with gain G, a loss element 542 which represents all the other losses, L, and the transmit-to-receive leakage loss 544, which represents the undesirable coupling of the transmit signal from the third port 534 to the second port 536 of circulator 538. The loop gain of the feedback loop 532 must be less than unity to prevent the feedback loop 532 from self-oscillating and becoming unstable. Therefore, the loop transmission, which is the product of the gain applied to the incoming signal, G, the transmit-to receive leakage, and all other RF losses, L, must be less than unity for the feedback loop to be stable. Thus, when amplifying the incoming signals for reflection enhancement, it is desirable to minimize the transmit-to-receive leakage signal in order to provide a larger gain to the incoming signal, G, and therefore a larger reflection enhancement.

Ferrite circulators, which are the most common type of circulator, typically have a transmit-to-receive leakage signal of about −15 dB. Recently, photonic circulators have been developed that have a transmit-to-receive leakage signal of about −40 dB. Second generation photonic circulators have an even lower projected leakage. Therefore, active reflectors according to the present teaching that include a photonic circulator having a transmit-to-receive leakage, which is more than 100 times lower than the conventional ferrite circulators, can have more than a 100 times wider range of active outgoing signal levels compared with active reflectors including a conventional ferrite circulator.

Figure 4C:
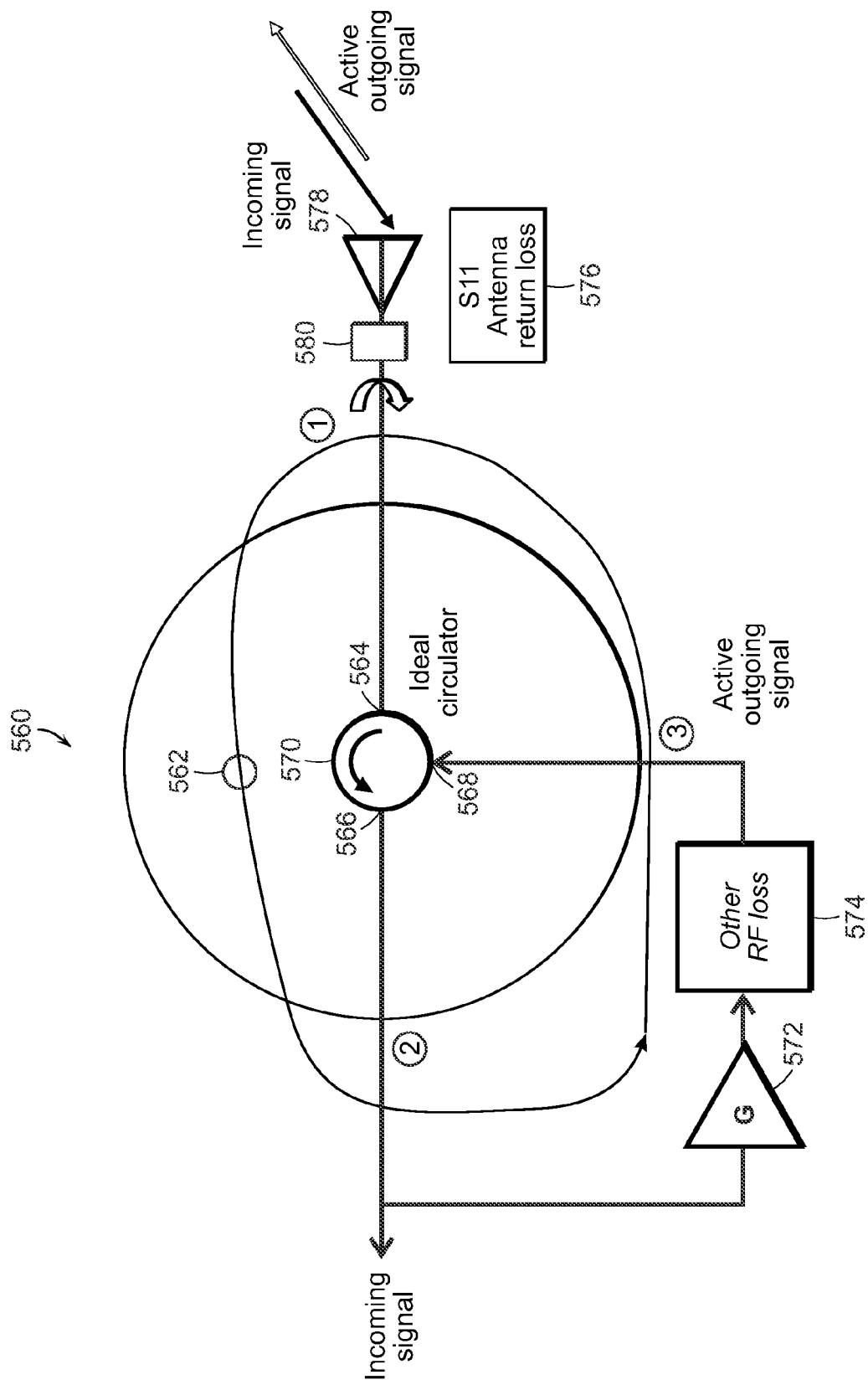
FIG. 4C illustrates a model of a circulator that shows the feedback loop between the first, the second, and the third port.

FIG. 4C illustrates a model 560 of a circulator that shows the feedback loop 562 between the first port 564, the second port 566, and the third port 568 of the circulator 570. The feedback loop 562 includes a gain element 572 with gain G and a loss element 574 representing the sum of all the losses except the antenna return loss, L, the antenna return loss, $S_{11}$, 576 and the circulator transfer function from the first port 564 to the second port 566 of the circulator 570. The loop gain of the feedback loop 562 must be less than unity to prevent the feedback loop 562 from self-oscillating and becoming unstable. In passive circulators, such as RF and optical ferrite circulators, the circulator transfer function between ports 1 and 2, 564 and 566 respectively, will be a small loss, typically less than 1 dB. In some embodiments using active circulators, such as electronic and photonic circulators, the circulator 570 can be operated to have gain between the first port 564 and the second port 566 of the circulator 570. Hence with active circulators, it is particularly desirable to minimize the antenna return loss $S_{11}$.

Broad bandwidth antennas have a significant return loss that can be on order of about 15 dB. However, in some systems with narrow bandwidth, a tunable antenna matching circuit 580 is electrically connected between the antenna 578 and the first port 564 of the circulator 570 in order to reduce antenna return loss.

The actively reflected signal, σ, can be described as a function of the active reflector parameters and the wavelength of the signal by the following equation:

$$\sigma = (G_{Ant})^2 * \lambda^2 * G_{Amp} * L/4\pi$$

where $G_{Ant}$ is the antenna gain, $G_{Amp}$ is the gain of the amplifier, and λ is the wavelength of the incoming and outgoing signal. Therefore, the actively reflected signal is determined only by the antenna gain, the amplifier gain, and the wavelength. Thus, for a given incoming signal wavelength, the active reflector can be designed to generate any desired actively reflected signal that is within the stability parameters and performance limitations of the antenna and amplifier.

Referring to FIGS. 4A, 4B, and 4C, one performance metric for the active reflector is the range of the outgoing signals it can generate, which is bounded by the maximum and minimum active outgoing signals the active reflector can generate. We consider the maximum signal first. In an ideal circulator 502 of FIG. 4A, the signals travel only in the counter-clockwise direction as shown by the arrow in the circulator 502, and therefore there is no signal path in the opposite direction. Therefore, the gain of the active reflector can be made arbitrarily large without causing any self-oscillation in the active reflector. Practical circulators, however, do have significant signal paths in the clockwise direction and these signal paths limit the gain of the active reflector and, consequently the maximum energy in the active outgoing signal. The maximum outgoing signal level, for both the reflection enhancement and the reflection suppression modes, can be determined by analyzing the feedback loops that are established by the non-ideal performance of the circulator 502 and the antenna 516, representative examples of which were described in connection with FIGS. 4B and 4C.

The minimum active outgoing signal is set by two factors. The first factor which determines the minimum active outgoing signal is the receive-to-transmit isolation 510 (also called the receive-to-antenna port isolation). The receive-to-transmit isolation 510 is the leakage signal from the second port 508 to the first port 512. The second factor determining the minimum active outgoing signal is the circulator port 1 reflection, which is the return loss of the first port 512 that is connected to the antenna 516.

In an ideal circulator, the receive-to-transmit isolation 510 would be infinite and the circulator port 1 reflection 514 would be zero. However, in a practical circulator one or both of these factors will set a lower bound on the minimum active outgoing signal. A conventional ferrite circulator typically has a leakage signal from the second port 508 to the first port 512 that is typically in the range of about −7 to −15 dB and an antenna port isolation of about −15 dB. A photonic circulator typically has a leakage signal from the second port 508 to the first port 512 that is theoretically zero and for all practical purposes is essentially zero and an antenna port isolation of about −20 to −40 dB.

Bandwidth is another important metric for the active reflector according to the present teaching. Ferrite circulators have a fractional bandwidth of about two, which corresponds to one octave. Recently photonic circulators have been developed that have demonstrated a fractional bandwidth of more than 3,000, which corresponds to three decades. Using a photonic circulator in the active reflector of the present teaching enables the active reflector to generate active outgoing signals over a wide bandwidth that is suitable for many state-of-the-art applications.

Equivalents

While the Applicants' teaching are described in conjunction with various embodiments, it is not intended that the Applicants' teaching be limited to such embodiments. On the contrary, the Applicants' teaching encompass various alternatives, modifications, and equivalents, as will be appreciated by those of skill in the art, which may be made therein without departing from the spirit and scope of the teaching.

What is claimed is:

1. An electromagnetic reflector comprising:
   a) an antenna that receives an incoming signal and that transmits an active outgoing signal;
   b) a three-port non-reciprocal device having a first port electromagnetically coupled to the antenna, a second port, and a third port; and
   c) a circuit having an input electromagnetically coupled to the second port of the three-port non-reciprocal device and having an output electromagnetically coupled to the third port of the three-port non-reciprocal device, the circuit changing at least one of a gain and a phase of the incoming signal to generate the active outgoing signal that passes through the three-port non-reciprocal device to the antenna, the active outgoing signal combining with a passive reflection signal from a surface to form a desired outgoing signal.

2. The electromagnetic reflector of claim 1 wherein the three-port non-reciprocal device comprises an RF three-port non-reciprocal device and the circuit comprises an RF circuit.

3. The electromagnetic reflector of claim 1 wherein the three-port non-reciprocal device comprises an optical three-port non-reciprocal device and the circuit comprises an optical circuit.

4. The electromagnetic reflector of claim 1 wherein the three-port non-reciprocal device comprises a circulator.

5. The electromagnetic reflector of claim 1 wherein the circuit generates positive gain that amplifies the active outgoing signal relative to the incoming signal.

6. The electromagnetic reflector of claim 1 wherein the circuit generates negative gain that attenuates the active outgoing signal relative to the incoming signal.

7. The electromagnetic reflector of claim 1 wherein the circuit shifts a phase of the active outgoing signal relative to the phase of the incoming signal by 180 degrees.

8. The electromagnetic reflector of claim 1 wherein the circuit maintains a phase of the active outgoing signal to be substantially equal to the phase of the incoming signal.

9. The electromagnetic reflector of claim 1 wherein the circuit comprises at least one of an electrically controllable gain control circuit and an electrically controllable phase control circuit.

10. The electromagnetic reflector of claim 1 wherein the circuit generates at least one of a gain control signal and a phase control signal corresponding to the active outgoing signal.

11. The electromagnetic reflector of claim 1 wherein the antenna comprises an omni-directional antenna.

12. The electromagnetic reflector of claim 1 wherein the antenna comprises a retro-reflecting antenna.

13. The electromagnetic reflector of claim 1 wherein the antenna comprises a retro-reflective antenna array.

14. The electromagnetic reflector of claim 1 further comprising a means for determining a direction of the incoming signal.

15. The electromagnetic reflector of claim 1 further comprising a means for controlling a direction of the active outgoing signal relative to a direction of the incoming signal.

16. The electromagnetic reflector of claim 1 further comprising a signal processor having an output that is coupled to a control input of the circuit, wherein the signal processor generates a signal instructing the circuit to generate the active outgoing signal.

17. The electromagnetic reflector of claim 1 further comprising a passive reflector that reflects the incoming wave in a direction of the active outgoing signal.

18. The electromagnetic reflector of claim 1 further comprising an antenna matching circuit coupled between the antenna and the first port of the three-port non-reciprocal device, the antenna matching circuit reducing an antenna return loss.

19. The electromagnetic reflector of claim 1 wherein the incoming and active outgoing signals have an arbitrary orientation.

20. The electromagnetic reflector of claim 1 wherein the active outgoing signal at least partially cancels the passive reflection signal from the surface.

21. An electromagnetic reflector comprising:
a) an antenna that receives an incoming signal and that transmits an active outgoing signal;
b) a three-port non-reciprocal device having a first port electromagnetically coupled to the antenna, a second port, and a third port;
c) a control circuit having a control input that is electrically connected to the output of the second port of the three-port non-reciprocal device, the control circuit modifying at least one of an amplitude and a phase of the incoming signal in response to a control signal, and providing the active outgoing signal to an output that is electrically connected to the third port of the three-port non-reciprocal device that passes the active outgoing signal to the antenna, the active outgoing signal combining with a passive reflection signal from a surface to form a desired signal; and
d) a signal processor having an output that is coupled to a control input of the control circuit, the signal processor generating a signal that instructs the control circuit to generate a signal which generates the active outgoing signal.

22. The electromagnetic reflector of claim 21 wherein the control circuit changes at least one of the gain and the phase of a continuous incoming signal to generate a continuous active outgoing signal.

23. The electromagnetic reflector of claim 21 wherein the control circuit generates positive gain that amplifies the active outgoing signal relative to the incoming signal.

24. The electromagnetic reflector of claim 21 wherein the control circuit generates negative gain that attenuates the active outgoing signal relative to the incoming signal.

25. The electromagnetic reflector of claim 21 wherein the control circuit shifts a phase of the active outgoing signal relative to a phase of the incoming signal by 180 degrees.

26. The electromagnetic reflector of claim 21 further comprising a passive reflector that reflects the incoming wave in the direction of the active outgoing signal.

27. The electromagnetic reflector of claim 21 further comprising a second antenna positioned to detect the active outgoing signal, the second antenna being electrically coupled to the control input of the control circuit.

28. The electromagnetic reflector of claim 21 wherein the active outgoing electromagnetic signal at least partially cancels the passive reflection signal from the surface.

29. A method for reflecting an electromagnetic wave, the method comprising:
a) receiving an incoming electromagnetic signal with an antenna;
b) propagating the incoming electromagnetic signal through a first port of a circulator to a second port of the circulator in a non-reciprocal propagation;
c) processing the electromagnetic incoming signal by changing at least one of a gain and a phase to generate an active outgoing electromagnetic signal;
d) propagating the active outgoing electromagnetic signal to a third port of the circulator where the active outgoing electromagnetic signal propagates to the first port of the circulator in a substantially non-reciprocal propagation;
e) propagating the active outgoing electromagnetic signal to the antenna; and
f) combining the active outgoing signal with a passive reflection signal from a surface to form a desired outgoing signal.

30. The method of claim 29 wherein the incoming and active outgoing electromagnetic signals comprise continuous electromagnetic waveforms.

31. The method of claim 29 wherein the incoming and active outgoing electromagnetic signals comprise pulsed electromagnetic waveforms.

32. The method of claim 29 wherein reflecting the electromagnetic wave comprises specularly reflecting the electromagnetic wave.

33. The method of claim 29 wherein reflecting the electromagnetic wave comprises retro-reflecting the electromagnetic wave.

34. The method of claim 29 wherein the processing the incoming electromagnetic signal comprises providing positive gain to the incoming electromagnetic signal.

35. The method of claim 29 wherein the processing the incoming electromagnetic signal comprises providing attenuation to the incoming electromagnetic signal.

36. The method of claim 29 wherein the processing the incoming electromagnetic signal comprises shifting the phase of the incoming electromagnetic signal by 180 degrees.

37. The method of claim 29 wherein the active outgoing electromagnetic signal at least partially cancels a passive reflection of the incoming electromagnetic signal.

38. The method of claim 29 wherein an amplitude of the incoming electromagnetic signal is greater than a portion of the active outgoing electromagnetic signal that leaks into a path of the incoming electromagnetic signal.

39. The method of claim 29 wherein an amplitude of the outgoing electromagnetic signal is greater than a portion of the incoming electromagnetic signal that leaks into the active outgoing electromagnetic signal path.

40. The method of claim 29 further comprising forming the active outgoing electromagnetic signal into a directional electromagnetic beam.

41. The method of claim 40 further comprising controlling a direction of the directional electromagnetic beam relative to the incoming electromagnetic signal.

42. The method of claim 29 wherein a loop gain comprising a product of the gain applied to the incoming electromagnetic signal, losses imparted during the processing of the incoming electromagnetic signal and during propagation of the incoming electromagnetic signal from the second port of the circulator to the third port of the circulator, and signal leakage from the third port of the circulator to the second port of the circulator is less than unity.

43. The method of claim 29 wherein a loop gain comprising a product of the gain applied to the incoming signal, losses imparted during the processing of the incoming electromagnetic signal and during propagation of the incoming electromagnetic signal from the second port of the circulator to the third port of the circulator, and an antenna return loss is less than unity.

44. The method of claim 29 further comprising measuring the outgoing electromagnetic signal and then processing the electromagnetic incoming signal in response to the measurement by changing at least one of the gain and the phase to generate the active outgoing electromagnetic signal.

* * * * *